United States Patent
Reinhold

(10) Patent No.: US 10,608,300 B2
(45) Date of Patent: Mar. 31, 2020

(54) HOUSING ARRANGEMENT FOR AT LEAST ONE BATTERY CELL

(71) Applicant: HOPPECKE Advanced Battery Technology GmbH, Zwickau (DE)

(72) Inventor: Stefan Reinhold, Zwickau (DE)

(73) Assignee: HOPPECKE Advanced Battery Technology GmbH, Zwickau (DE)

( * ) Notice: Subject to any disclaimer, the term of this patent is extended or adjusted under 35 U.S.C. 154(b) by 73 days.

(21) Appl. No.: 15/760,145

(22) PCT Filed: Jun. 6, 2016

(86) PCT No.: PCT/EP2016/062809
§ 371 (c)(1),
(2) Date: Mar. 14, 2018

(87) PCT Pub. No.: WO2017/045783
PCT Pub. Date: Mar. 23, 2017

(65) Prior Publication Data
US 2018/0254534 A1    Sep. 6, 2018

(30) Foreign Application Priority Data

Sep. 17, 2015    (DE) .................. 10 2015 115 728

(51) Int. Cl.
*H01M 10/647* (2014.01)
*H01M 10/6563* (2014.01)
(Continued)

(52) U.S. Cl.
CPC ....... *H01M 10/647* (2015.04); *H01M 2/1016* (2013.01); *H01M 2/1061* (2013.01); *H01M 2/1094* (2013.01); *H01M 10/0525* (2013.01); *H01M 10/653* (2015.04); *H01M 10/6563* (2015.04); *H01M 10/6566* (2015.04); *H01M 10/052* (2013.01)

(58) Field of Classification Search
CPC ............. H01M 10/647; H01M 2/1016; H01M 2/1094; H01M 10/0525; H01M 10/653; H01M 10/6566; H01M 10/6563; H01M 2/1061; H01M 10/052
See application file for complete search history.

(56) References Cited

U.S. PATENT DOCUMENTS

2012/0088132 A1*  4/2012  Ahn ..................... H01M 10/647
                                                            429/83
2013/0011701 A1*  1/2013  Petzinger ............ H01M 2/1077
                                                            429/48
2015/0093608 A1*  4/2015  Seong ................. H01M 2/0267
                                                            429/56

FOREIGN PATENT DOCUMENTS

CN        102315476 A      1/2012
EP          2562848 A2     2/2013

* cited by examiner

*Primary Examiner* — Stewart A Fraser
(74) *Attorney, Agent, or Firm* — Rudy J. Ng; Bret E. Field; Bozicevic, Field & Francis LLP

(57) ABSTRACT

The present invention relates to a housing arrangement (10) for at least one battery cell (1), preferably a lithium battery cell (1) and/or a lithium pouch cell (1), wherein the housing arrangement (10) comprises at least one frame element (20) which comprises a wall (30) and an intermediate space (40) configured by the wall (30) for the acceptance of the battery cell (1), wherein at the wall (30) multiple ventilation recesses (50) are provided, wherein the ventilation recesses (50) comprise such an alternating orientation that the entry of a fluid (5) can occur alternatingly through the ventilation recesses (50).

25 Claims, 5 Drawing Sheets

Figure 3:
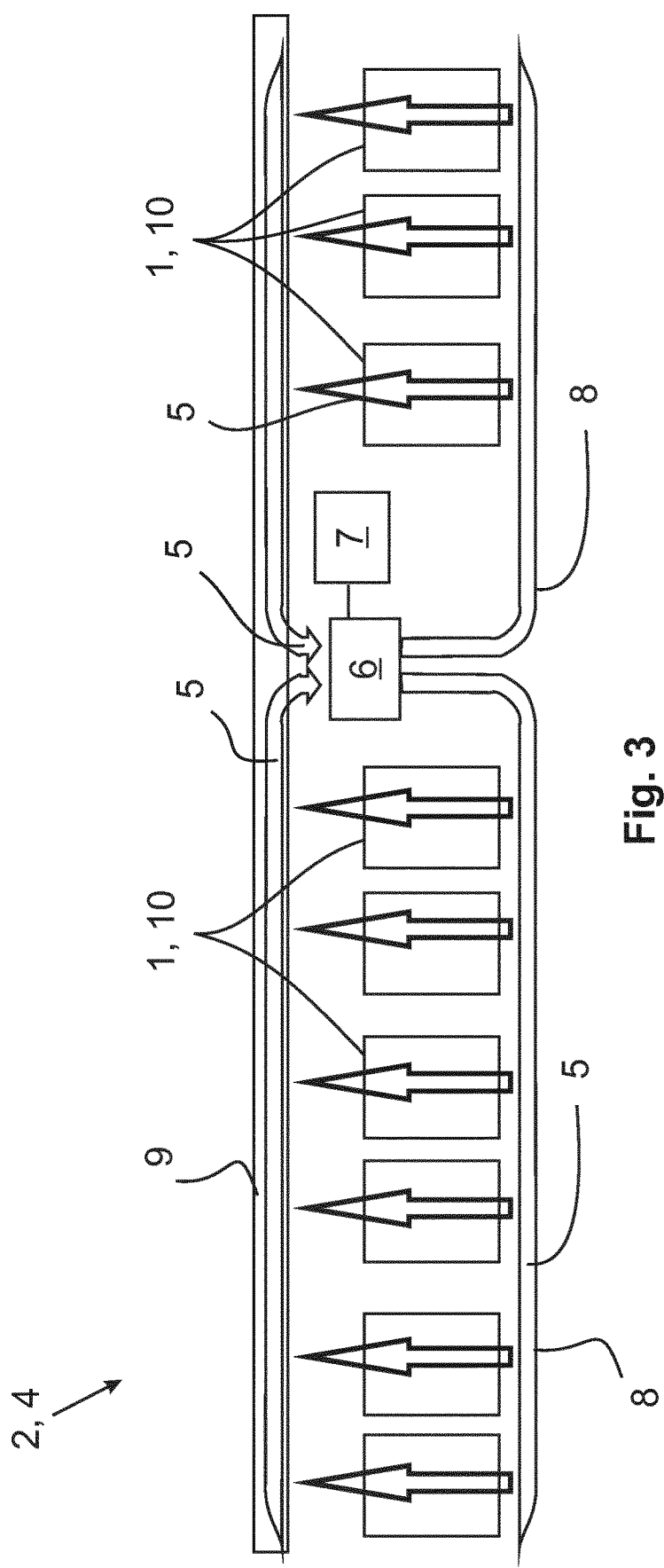

(51) Int. Cl.
*H01M 10/6566* (2014.01)
*H01M 2/10* (2006.01)
*H01M 10/653* (2014.01)
*H01M 10/0525* (2010.01)
*H01M 10/052* (2010.01)

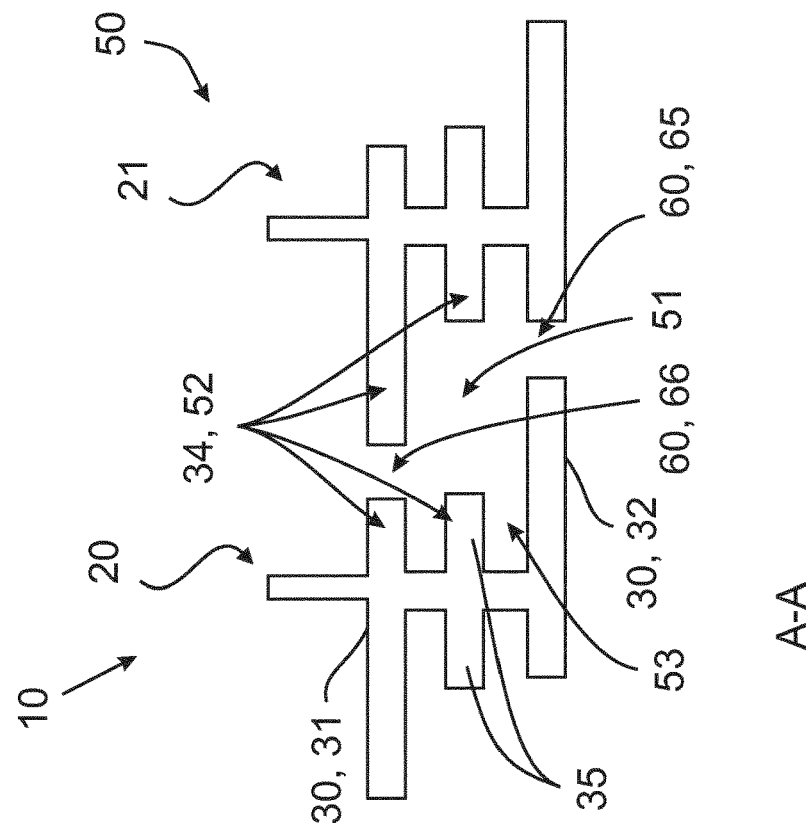
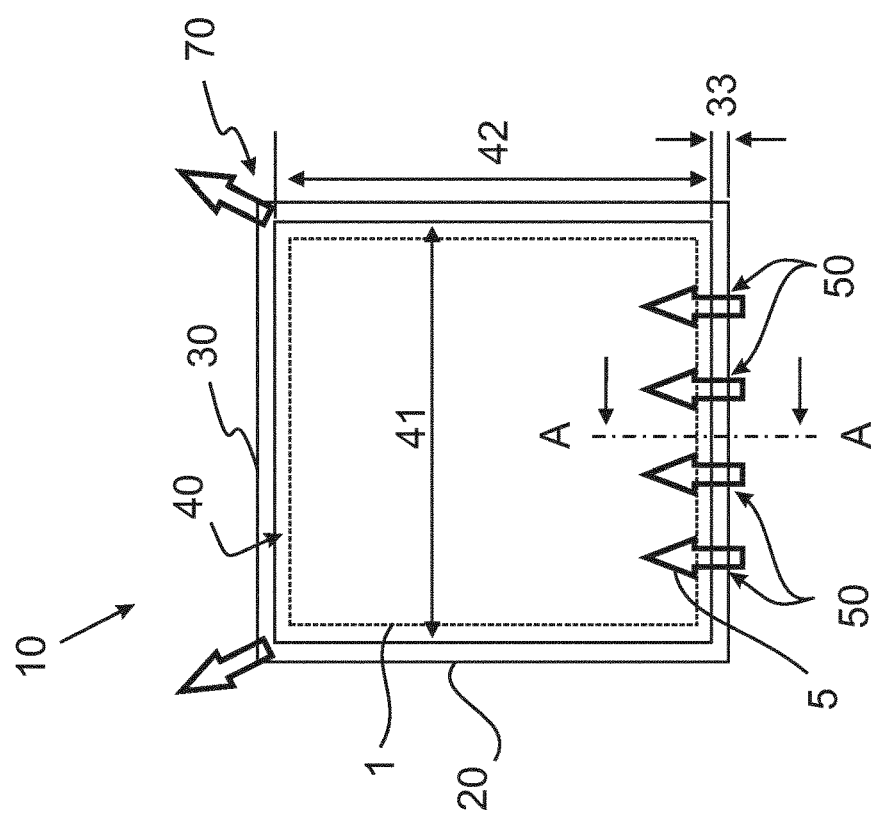
Fig. 1
Fig. 2

HOUSING ARRANGEMENT FOR AT LEAST ONE BATTERY CELL

The present invention relates to a housing arrangement for a battery cell, preferably a lithium battery cell and/or a lithium pouch cell. Further, the invention relates to a battery system, a method and a ventilation system.

It is known from the state of the art that battery cells, particularly the battery cell of lithium batteries, are for example configured in a so-called pouch cell format (or pouch bag cell or coffee bag cell). Hereby, mostly the housing of the battery cell is configured non-rigid, but comprises a film which is for example configured from aluminium. Therewith, the housing and/or the battery cell comprises a certain flexibility and thus the battery cell possesses various applications.

The battery cell comprises a non-sufficient mechanic stability for multiple applications since the battery cell is mostly only provided shrink-wrapped in a film. Further, a temperature increase can result due to the high performance and energy-density of lithium batteries by which a damage of the lithium battery or the lithium cell is possible. Thereby too low and too high temperatures can lead critical states since the battery cell should be ideally operated in a specific temperature range. Likewise, a difference in the operating temperature for different cells of a battery system can cause problems since the different temperatures lead to an uneven aging of the battery cells.

It is therefore an object of the present invention to at least partially prevent the previously described disadvantages. Particularly, a housing arrangement should be provided which increases the stability of the battery cell and/or improves the battery and the operational safety. Further, particularly a critical operating state caused by a too high operation temperature should be prevented and preferably at the same time a sufficient electric insulation and/or a sufficient touch protection of the battery cell should be ensured.

The previous object is solved by a housing arrangement with the features according to the present disclosure, by a battery system with the features according to the present disclosure, by a ventilation system with the features according to the present disclosure and by a method with the features according to the present disclosure. Further features and details of the invention result from the respective dependent claims, the descriptions and the drawings. Thereby features and details which are described in connection with the housing arrangement according to the invention naturally also apply in relation to the battery system according to the invention and the ventilation system according to the invention and the method according to the invention and vice versa such that regarding the disclosure of the single aspects of the invention it can always be reciprocally related to.

The object is particularly solved by a housing arrangement for at least one battery cell, preferably a lithium battery cell and/or lithium pouch cell and/or for a battery module. The term "battery" relates to an accumulator which is a rechargeable battery. Thereby, it is provided that the housing arrangement comprises at least one frame element which comprises a wall and an inner space configured by the wall for the acceptance and/or bearing of at least one battery cell (and/or the battery module with multiple battery cells), wherein multiple ventilation recesses are provided at the wall, wherein the ventilation recesses comprise such an alternating orientation particularly in width direction of the frame element that the entry of a fluid through the ventilation recesses can occur alternating particularly from the outer area to the inner space. The ventilation recesses are preferably material recesses of the wall which are for example arranged on one side of the frame element. Hereby, the advantage is achieved that the housing arrangement enables a sufficient cooling and/or heating of the battery cells. Thereby, it can be ensured that the battery cells are operated in the temperature range specific for each battery cell. Particularly, in order to prevent an uneven aging of the battery cells, an evenly distributed operating temperature at the battery cells can be ensured. The housing arrangement further enables an increase of the mechanic stability for the battery cell and/or for the battery modules and/or for the battery system. Further, a sufficient electric insulation and a sufficient touch protection for the battery cells and for other live (voltage leading) parts of the battery system can be ensured.

It can be particularly preferred that the housing arrangement comprises at least 2 or at least 3 or at least 4 or at least 10 or at least 20 or at least 30 frame elements which are particularly connected to one another and which configure an overall frame. The walls of the respective frame elements configure particularly an overall wall which configures the inner space for the acceptance of the battery cells and/or battery modules. Preferably, the single frame elements are (mainly) configured identically and can be particularly connected or arranged with one another such that in the area of the ventilation recesses at least one gap opening and/or at least one gap is formed between the adjacent walls of the frame elements. Since the formed gaps are configured from ventilation recesses of adjacent frame elements, the formed gaps comprise an alternating orientation such that the entry of the fluid through the gap openings can occur alternating particularly into the inner space. Hereby, an even and particularly both-sided cooling of the battery cells in the inner space can be ensured.

Preferably, it can be provided that the wall comprises an outer wall and an inner wall, wherein in the area of the ventilation recesses such a configured ventilation geometry is provided between the outer wall and the inner wall that at least one intermediate space is configured by the outer wall and the inner wall, wherein particularly the intermediate space forms the ventilation recess or the ventilation opening. The outer wall is particularly a wall facing the outer area of the battery cell and the inner wall is preferably a wall facing the inner space, wherein preferably the outer wall is arranged on the opposing side or mainly parallel and spaced apart to the inner wall. The distance between the outer wall and the inner wall preferably amounts to between 1 mm and 100 mm, particularly preferred between 5 mm and 50 mm, preferably between 10 mm and 20 mm. Preferably wall elements particularly wall means are arranged between the inner wall and the outer wall which are configured preferably from one material and/or from one piece with the outer wall and/or the inner wall. Further, particularly the outer wall and the inner wall can be configured from one piece and/or monolithic and/or fluid-tight or fluid-impermeable. The fluid is for example a gas, particularly air. In order to ensure that the fluid can reach the inner space to the heating or cooling of the battery cell, starting from the outer area of the battery cell and/or housing arrangement, the intermediate space is preferably fluid-permeable, meaning particularly configured completely free from material. With one single frame element the intermediate space can preferably comprise the wall only on one side and particularly can be configured free on the opposing side, which is at the outer side of the frame element or the wall. In this case it is provided that only with an arrangement of the frame element at a further frame element the intermediate space is partially enclosed on this opposing side of the wall of the further frame element and therewith the intermediate space configures an open cavity or opening. Therewith, a reliable entry of fluid into the inner space is ensured.

Further, it is optionally provided that the ventilation geometry comprises at least two fluid-tight wall means and/or at least one intermediate wall which is arranged particularly labyrinth-like in order to preferably configure auxiliary chambers in the intermediate space. The wall means and/or the intermediate wall and/or the auxiliary chambers are thereby preferably configured by the ventilation geometry. The ventilation geometry and/or the wall means and/or the intermediate wall thereby have the purpose to configure a flow resistance for the entering fluid. The auxiliary chambers are for example configured between the wall means and the intermediate wall. Thereby, the advantage is achieved that particularly the static pressure can be increased and/or the ratio between the static pressure and the dynamic pressure can be increased in order to force an equal distribution on the system level and/or for cooling and/or heating an equal distribution of the fluid. The intermediate space and/or the auxiliary chambers and/or the intermediate walls and/or the ventilation geometry with the auxiliary chambers preferably effect that sufficient air- and/or leakage paths are configured in order to ensure a sufficient electric insulation (or insulation resistance) despite of the ventilation openings in the frame element. Herefore, it is preferably provided that an air section of at least 5 mm to 20 mm, preferably 10 mm to 12 mm, particularly preferred 11 mm, is achieved by the ventilation geometry. Further it is particularly provided that a leakage path to the battery cell is achieved by the ventilation geometry of at least 15 mm to 30 mm, preferably 18 mm to 22 mm, particularly preferred 20 mm. This is particularly preferably achievable by the intermediate wall.

Further, it is possible that the frame element is configured from a plastic and particularly is an injection moulding part. The frame element can thereby for example be configured electrically insulating. This has the advantage that a sufficient touch protection of the battery cells is ensured, particularly with high voltage battery systems.

Further, it is an advantage when the inner space comprises a maximum width in the area of 50 mm to 550 mm, preferably 150 mm to 350 mm, preferably 200 mm to 220 mm and/or a maximum height in the area of 5 mm to 15 mm, preferably 10 mm to 12 mm. The width extends preferably in a width direction of the frame element and the height in a height direction of the frame element orthogonally to the width. Further, it is possible that the maximum width of the inner space is configured variably for example by a moveable arrangement of the walls. This has the advantage that a plurality of different battery cells can be used.

Further, it can be provided within the scope of the invention that at least one ventilation opening is provided at the wall, particularly on a side of the wall opposing the ventilation recesses, wherein the ventilation recess comprises a ventilation geometry particularly with at least two and/or at least three and/or at least four parallely arranged and equally oriented ventilation walls in order to guide the fluid entering the inner space trough ventilation recesses, particularly air entry (inlet) recesses, out of (the inner) space, preferably according to the orientation of the air outlet wall and/or to provide a touch protection to the battery cell. Hereby it is further possible that at a left-sided wall of the frame element a left-sided air outlet opening is provided and the fluid according to the orientation of the left-sided air outlet opening is deflected to the left (left-sided). Further, at the right-sided wall of the frame element a right-sided air outlet opening can be provided, wherein at the right-sided air outlet opening the fluid according to the orientation of the right-sided air outlet opening is deflected to the right (right-sided). The term "air outlet opening" relates naturally also to openings which enable the outlet of any fluid. The air outlet opening enables a reliable cooling and/or heating of the battery cells and/or a touch protection for the insulation of the battery cell.

It can be an advantage when within the scope of the invention a gap with a gap opening is formable by ventilation recesses of the (first) frame element complementary with the ventilation recesses of the adjacent further frame element, wherein preferably the gap opening comprises a maximum extension of 1 mm to 50 mm, preferably 5 mm to 20 mm, particularly preferred 8 mm to 10 mm. The configuration of the gap is particularly effected in that in the area of the ventilation recesses the extension/width of the wall is smaller than the maximum extension/width of the wall. The alternating orientation of the ventilation recesses effects an alternating orientation of the gaps. The alternating orientation of the gaps can thereby preferably alternate in the width direction of the wall and/or in the longitudinal direction. This enables an even and preferably both-sided flowing of the battery cells by the fluid. The width direction thereby preferably relates to a direction which is orthogonal to the height direction and/or to the arrangement direction of the frame elements. The longitudinal direction corresponds for example to the arrangement orientation of the frame elements. The height direction corresponds for example to a direction in which mainly the fluid flows along the battery cell in the inner space. The adjustment direction is the direction in which a modular arrangement or juxtaposition of further frame elements occurs.

It can be a further advantage that the ventilation recesses are arranged and/or oriented such that through the ventilation recesses particularly by the connection of the frame elements a further frame element, a gap on the outer side in the area of the outer wall and a gap on the inner side in the area of the inner wall is formable, wherein particularly the gap on the outer wall is arranged with an offset (particularly an offset in width direction or an offset in lateral direction relative to the flow direction of the fluid flowing through the gap) from the gap on the inner side. By the offset it is particularly effected that the flow through the intermediate space between the gap on the outer side and the gap on the inner side (flow direction) occurs with an angle. Particularly, the alternating orientation of the ventilation recesses and/or the gaps relates to the fact that the air direction through the intermediate gap occurs for adjacent ventilation recesses or gaps alternating and/or the offset with adjacent gaps and/or the ventilation recesses mirror-inverted. Therewith, the advantage is achieved that the flow resistance is increased and therewith an even flow can be achieved.

Preferably it can be provided within the scope of the invention that the battery cell is bearable or arrangeable in the inner space between two adjacently arranged frame elements, wherein particularly the ventilation recesses are arranged and/or are alternating oriented such that the surface of the battery cell can be streamed from both sides particularly alternating front and back side by a fluid flowing through the ventilation recesses. The term "both sides" relates particularly to both outer sides of the battery cell which comprise the greatest surface of the battery cell, respectively. Hereby preferably one side is described as a front side and the opposing side as a back side. The both-sided streaming of the battery cell with the fluid thereby occurs particularly for all battery cells of the battery module and/or the battery system due to the same configuration of the different frame elements in the same manner such that an uneven aging between the battery cells can be counteracted.

Further, it can be provided within the scope of the invention that the wall comprises a maximum wall thickness in the area of 1 cm to 10 cm, preferably 2 cm to 5 cm, preferred 3 cm to 4 cm. Therewith, a sufficient insulation and a sufficient touch protection and a sufficient mechanic stability can be ensured.

Further, it is enabled within the scope of the invention that the frame element is configured electrically insulating and particularly comprises an electric insulating and/or fluid-tight polymer. Hereby, a sufficient insulation, particularly for high voltage applications, is achieved.

It can be for example provided that at least a connecting element is provided in order to connect the frame element with further frame elements. The connecting element can thereby for example be suitable to accept a connecting means and/or a fastening means in order to form- and/or force-fittingly connect the frame elements with one another. The connecting element is thereby for example configured as an acceptance for the connecting means and/or fastening means. Therewith a sufficient stability and a modular expandability of the housing arrangement is achieved.

In a further possibility it can be provided that the frame element and/or at least one connecting element is configured such that the frame element is modularly connectable with further frame elements. This is particularly achieved in that the frame elements are configured similar or identically and complimentary, meaning can be particularly connected by the alternating orientation of the ventilation recesses with one another such that gaps for the fluid entry result which are evenly distributed along the inner space. Hereby the advantage is achieved that for example at least 20 and/or 30 and/or 36 battery cells are modularly accepted by the housing arrangement.

Likewise, subject matter of the invention is a battery system comprising at least a battery cell and/or a battery module, particularly with a housing arrangement according to the invention. Hereby, it is provided that the battery cells are beared in an inner space and the inner space is configured by a wall of at least one frame element, and particularly by the wall of a further frame element arranged adjacently thereto. Multiple ventilation recesses can be provided particularly at the wall, wherein the ventilation recesses comprise such an alternating orientation that the entry of a fluid through the ventilation recess can occur alternating, particularly into the inner space. Therewith, the battery system according to the invention provides the same advantages like they are described in detail in relation to the housing arrangement according to the invention. The battery system can thereby for example be configured as a high voltage battery system for high voltage applications. The battery system thereby comprises for example multiple battery modules (wherein particularly each battery module comprises a housing arrangement according to the invention with multiple frame elements), wherein each battery module comprises preferably multiple battery cells.

Likewise, subject matter of the invention is a ventilation system, particularly for cooling and/or heating of a battery system with at least one battery cell, particularly of a battery system according to the invention. Hereby, it is particularly preferred that the ventilation system comprises at least one blower and at least one channel, wherein with the blower a fluid is guidable through the channel to at least two ventilation recesses of a housing arrangement, particularly a housing arrangement according to the invention. Thereby it is preferably provided that the housing arrangement comprises at least one frame element which comprises a wall and an inner space configured by the wall for the acceptance of the battery cell, wherein at the wall the ventilation recesses are provided, wherein the ventilation recesses comprises an alternating orientation such that the entry of the fluid can occur alternating through the ventilation recesses. Therewith the ventilation system according to the invention provides the same advantages like they are described in detail in relation to a battery system according to the invention and/or a housing arrangement according to the invention.

Further, it can be an advantage within the scope of the invention that the ventilation recesses particularly air entry recesses and/or at least one air outlet opening (at the wall) is configured such that with an active blower an average (and/or maximum and/or minimum) static pressure occurs which at least corresponds to the 2-fold or 2.5-fold or 5-fold of the maximum and/or average (and/or minimum) dynamic pressure. In order to ensure that all battery cells of the battery system are always operated with the same temperature it is particularly crucial that all battery cells are mainly streamed against with the same amount of fluid at mainly the same temperature. The even air distribution can preferably be achieved in that the blower is a central blower, particularly for the forced conveyance of the fluid in order to supply battery cells evenly with a fluid flow.

In a further possibility it can be provided that the blower is connected with a heat exchanger in order to cool and/or heat the fluid. The heat exchanger can thereby preferably be configured as an air-water heat exchanger and particularly be connected to an external air conditioning unit in order to temper the air according to a specification. The heat exchanger and/or the air conditioning unit can thereby preferably be controlled in dependence of the measured temperature values in order to enable a reliable adjustment of the specific temperature area for the battery cells. Hereby, for the temperature measurement for example measurement sensors can be provided at the housing arrangement.

It is further enabled that the channel and/or the back flow channel comprises a diameter which at least corresponds to the 2-fold or at least 4-fold or at least 6-fold of the maximum diameter of the ventilation recesses, wherein for the acceptance of the fluid particularly the back flow channel is connected with the wall in the area of at least one air outlet opening of the housing arrangement. Thereby, it is particularly effected by the blower that in the whole channel an approximately identical static overpressure is applied, wherein mainly all battery modules and/or all battery cells are supplied with mainly the same amount of air or with mainly the same amount of fluid via the gaps. Thereby, the fluid flows through the battery modules and/or battery cells and/or the inner spaces and heats or cools particularly the battery cells. Subsequently the fluid can reach a back flow channel particularly via the air outlet openings which guides the fluid back to the blower and/or heat exchanger. Hereby, a reliable cooling of the battery system and/or the battery modules is achieved.

Likewise, a method for cooling and/or heating of a battery system, particularly a battery system according to the invention, and/or at least one battery cell, is protected, wherein a housing arrangement particularly a housing arrangement according to the invention is provided and the housing arrangement comprises at least one frame element which comprises a wall and an inner space established by the wall for the acceptance of the battery cell, wherein at the wall multiple ventilation recesses are provided, wherein the ventilation recesses comprise such an alternating orientation that the entry of a fluid through the ventilation recesses occurs alternatingly. Preferably, a ventilation system according to the invention can be used for the method. Thereby, the method according to the invention provides the same advantages like they are described in detail in relation to the battery system according to the invention and/or a housing arrangement according to the invention and/or a ventilation system according to the invention.

Figure 4:
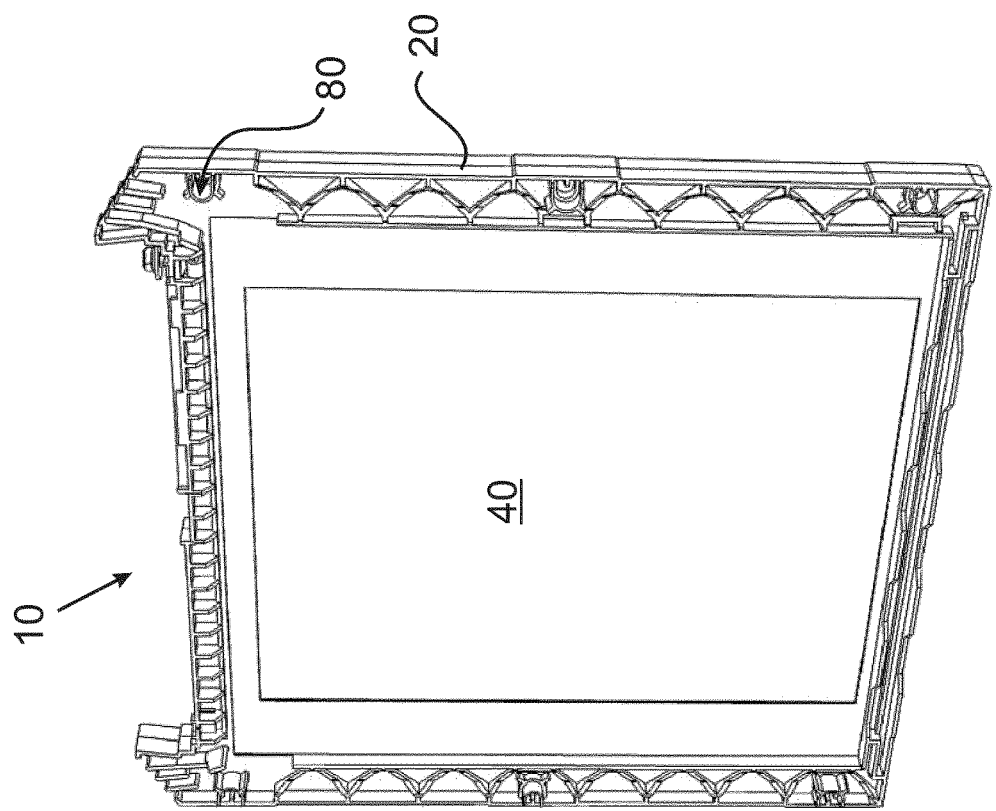
Figure 6:
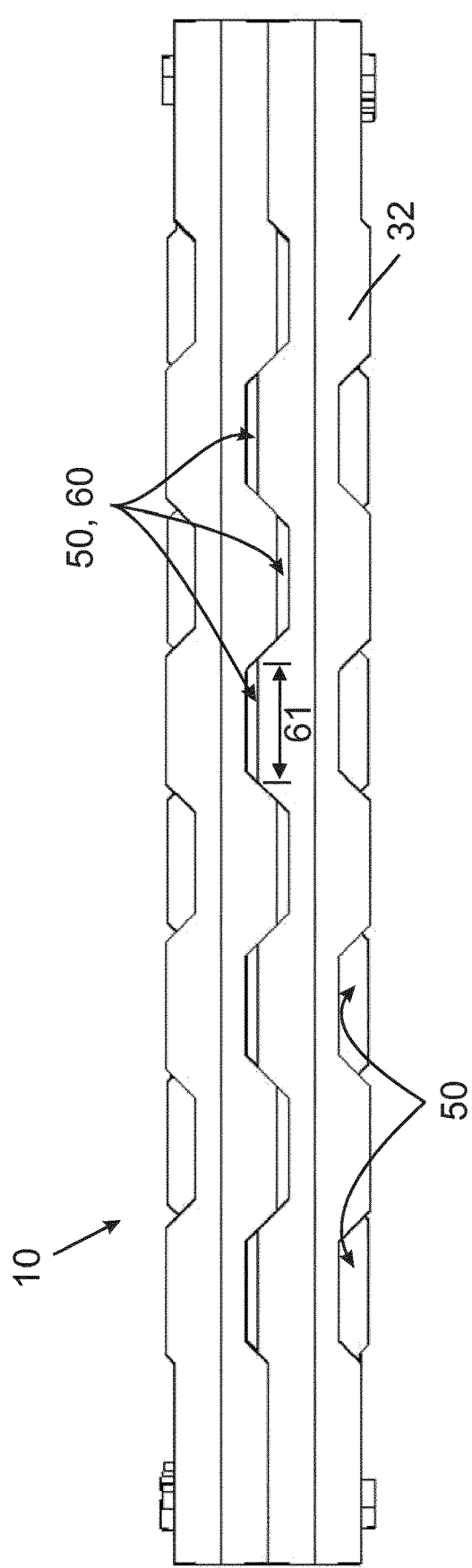
Figure 8:
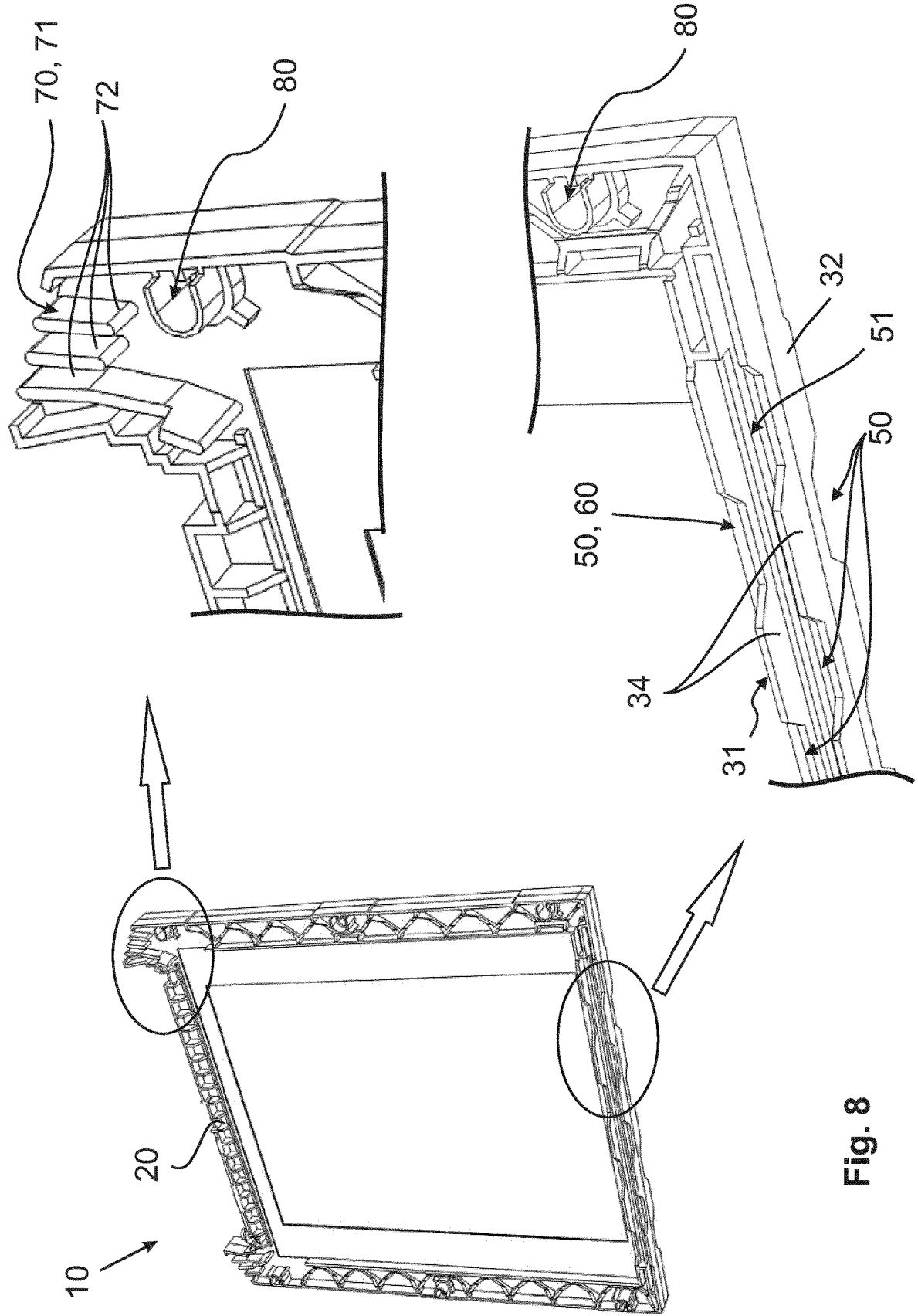

Further advantages, features and details of the invention result from the subsequent description which in detail describes embodiments of the invention with relation to the figures. Thereby, the features described in the claims and in the description can be essential for the invention each single by themselves or in any combination. It is shown:

FIG. 1 a schematic representation of a housing arrangement according to the invention, FIG. 2 a schematic sectional view through a housing arrangement according to the invention, FIG. 3 a schematic view of a battery system according to the invention and a ventilation system according to the invention, FIG. 4, 5 a schematic perspective view of a housing arrangement according to the invention, FIG. 6, 7 a schematic view of a underside of a housing arrangement according to the invention, FIG. 8 a schematic enlarged view of parts of a housing arrangement according to the invention.

In FIG. 1 a lateral view of a housing arrangement 10 is schematically shown. Thereby, a frame element 20 is shown in a lateral view, wherein a wall 30 of the frame element 20 configures an inner space 40. In this inner space 40 a battery cell 1 and/or a battery module 1 consisting of a plurality of battery cells 1 can be arranged. This is shown by the dotted line. Further, it is shown that the frame element 20 of the housing arrangement 10 comprises a width direction or width 41 mainly orthogonal to the flow direction of the fluid 5 in the area of the ventilation recesses 50. The height 42, however, extends orthogonal to the width 41 and mainly parallel to the flow direction in the area of the ventilation recesses 50. The flow direction of an entering fluid 5 and an exiting fluid 5 is thereby schematically represented by arrows. Further, a wall thickness 33 of the wall 30 is characterized which particularly indicates the distance between the inner wall 31 and the outer wall 32.

FIG. 2 schematically shows a sectional view through the level A-A marked in FIG. 1. Thereby the inner wall 31 and the outer wall 32 of the wall 30 are shown, wherein the inner wall 31 adjoins directly to the inner space 40. The left wall 30 is thereby configured by the, particularly a first, frame element 20 and the right wall 30 by a further frame element 21 (separately configured from the first frame element 20). The wall 30 of the first frame element 20 and the further frame element 21 are preferably configured separately from one another respectively. Due to the ventilation recesses 50 a gap 60 is configured between the wall 30 of the first frame element 20 and the wall 30 of the further frame element 21. The gap 60 comprises a maximum extension 61 which is shown in FIG. 6. Further, the gap 60 comprises a first gap on the outer side 65 and a second gap on the inner side 66. The area between the gap 65 on the outer side and the gap 66 on the inner side configures an intermediate space 51. In the area of the intermediate space 51 further a ventilation geometry 52 is configured in order to preferably configure a flow resistance. The ventilation geometry 52 comprises for example wall means 34 and/or at least an intermediate wall 35, wherein between the wall means 34 and the intermediate wall 35 at least one auxiliary chamber 53 is established.

In FIG. 3 a battery system 2 according to the invention and a ventilation system 4 according to the invention are schematically shown. The battery system 2 comprises thereby at least a battery cell 1 and/or at least a battery module 1. The ventilation system 4 comprises at least a blower 6 which is particularly connected to a heat exchanger 7 for cooling and/or heating of the fluid 5. By the blower 6 the fluid 5 is guided through the channel 8 which is dimensioned sufficiently great that a static pressure greater than a dynamic pressure and/or an even air distribution and/or an even static overpressure can act on the battery cell 1 and/or the battery module 1. Further, the back flow channels 9 corresponding to the channels 8 are sufficiently dimensioned which guide the fluid 5 back to the blower 6.

Figure 5:
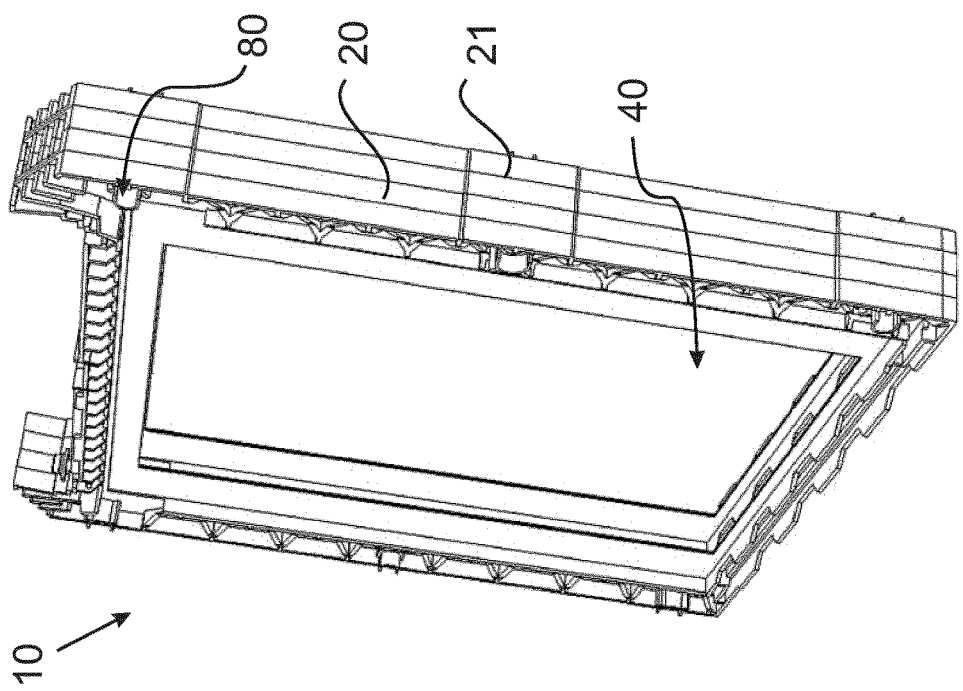

In FIGS. 4 and 5 the housing arrangement 10 according to the invention is shown perspectively. Thereby, in FIG. 4 only a frame element 20 and in FIG. 5 a (first) frame element 20 and a further frame element 21 is shown which are connected with one another. Between the first frame element 20 and the further frame element 21 a battery cell 1 and/or a battery module 1 can be introduced and/or clamped in the intermediate space 51. Further, a connecting element 80 is shown which is configured as an acceptance for the fastening means.

Figure 7:
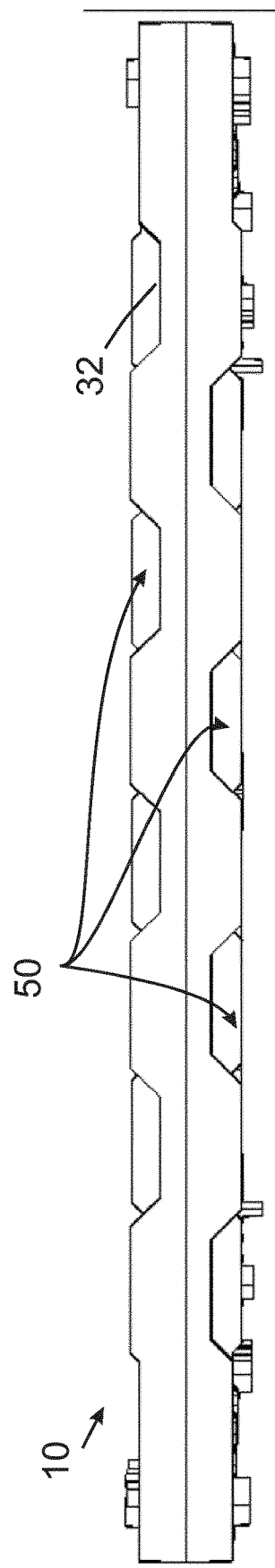

In FIGS. 6 and 7 an underside of the housing arrangement 10 is shown. Thereby, the alternating orientation of the ventilation recesses 50 or the gaps 60 can be recognized particularly in width direction. Further, it is shown that at least two frame elements 20, 21 have to be connected to one another in order to configure a gap 60 for the entry of the fluid 5.

FIG. 8 shows an enlarged view of the ventilation recesses 50 and an air outlet opening 70. The air outlet opening 70 comprises an air outlet geometry 71 which at least comprises an air outlet wall 72. The air outlet walls 72 are arranged such that the outlet of the fluid 5 can be specifically deflected in a defined direction and/or a touch protection to the battery cell 1 can be achieved. In the shown embodiment the air outlet openings 70 are arranged on a side of the frame element 20 opposing the ventilation recesses 50, wherein particularly in width direction at least two air outlet openings 70 are arranged on opposing sides at the frame element 20. The respective air outlet openings 70 are thereby preferably arranged on the outer side of the frame element 20 on the left and right side.

The previous description of the embodiments describes the present invention only within the scope of examples. Naturally, single features of the embodiments, as far as technically meaningful, can be freely combined with one another without leaving the scope of the invention.

REFERENCE LIST 1 battery cell, battery module
2 battery system
4 ventilation system
5 fluid, flow
6 blower
7 heat exchanger
8 channel
9 back flow channel
10 housing arrangement
20 frame element
21 further frame elements 30 wall
31 inner wall
32 outer wall
33 wall thickness
34 wall means
35 intermediate wall
40 inner space
41 width
42 height
50 ventilation recesses, air inlet recesses
51 intermediate space
52 ventilation geometry
53 auxiliary chambers
60 gap
61 maximum extension
65 outer gap
66 inner gap
70 air outlet opening
71 air outlet geometry
72 air outlet wall
80 connecting element

The invention claimed is:

1. A housing arrangement for at least one battery cell, wherein the housing arrangement comprises at least one frame element which comprises a wall and an inner space configured by the wall for the acceptance of the battery cell, wherein at the wall multiple ventilation recesses are provided, wherein the ventilation recesses comprise an alternating orientation such that the entry of a fluid can occur alternatingly through the ventilation recesses.

2. The housing arrangement according to claim 1, wherein
the wall comprises an outer wall and an inner wall, wherein in the area of the ventilation recesses a ventilation geometry is provided between the outer wall and the inner wall which is configured such that an intermediate space is configured by the outer wall and the inner wall.

3. The housing arrangement according to claim 2, wherein
the ventilation geometry at least comprises at least two fluid-tight wall means or at least one intermediate wall.

4. The housing arrangement according to claim 2, wherein
the ventilation recesses are at least arranged or aligned such that through the ventilation recesses, an outer gap can be configured in the area of the outer wall and an inner gap can be configured in the area of the inner wall.

5. The housing arrangement according to claim 1, wherein
the frame element is configured from a plastic.

6. The housing arrangement according to claim 1, wherein
the inner space comprises at least a maximum width in the range of 50 mm to 550 mm or a maximum height in the range of 5 mm to 15 mm.

7. The housing arrangement according to claim 6, wherein
the inner space comprises at least a maximum width in the range of 150 mm to 350 mm.

8. The housing arrangement according to claim 6, wherein
the inner space comprises at least a maximum width in the range of 200 mm to 220 mm.

9. The housing arrangement according to claim 6, wherein
the inner space comprises a maximum height in the range of 10 mm to 12 mm.

10. The housing arrangement according to claim 1, wherein
at the wall at least one air outlet opening is provided, wherein the air outlet opening comprises an air outlet geometry in order to guide the fluid entering the inner space through the ventilation recesses.

11. The housing arrangement according to claim 1, wherein
through the ventilation recesses of the frame element a gap with a gap opening can be configured complementary with the ventilation recesses of an adjacently further frame element, wherein the gap opening comprises a maximum extension of 1 mm to 50 mm.

12. The housing arrangement according to claim 1, wherein
the battery cell can be mounted in the inner space between two adjacently arranged frame elements.

13. The housing arrangement according to claim 1, wherein
the wall comprises a maximum wall thickness in the range of 1 cm to 10 cm.

14. The housing arrangement according to claim 13, wherein
the wall comprises a maximum wall thickness in the range of 2 cm to 5 cm.

15. The housing arrangement according to claim 13, wherein
the wall comprises a maximum wall thickness in the range of 3 cm to 4 cm.

16. The housing arrangement according to claim 1, wherein
the frame element is configured to be electrically insulating.

17. The housing arrangement according to claim 1, wherein
at least one connecting element is provided in order to connect the frame element with further frame elements.

18. The housing arrangement according to claim 1, wherein
at least the frame element or at least a connecting element are configured such that the frame element is modularly connectable with further frame elements.

19. A battery system comprising at least one battery cell, wherein the battery cell is mounted in an inner space and the inner space is configured by a wall of at least one frame element, wherein multiple ventilation recesses are provided at the wall, wherein the ventilation recesses comprise an alternating orientation such that the entry of the fluid through the ventilation recesses occurs alternatingly.

20. A ventilation system, wherein the ventilation system comprises at least one blower and at least one channel, wherein a fluid is conveyed through the channel by the blower to at least two ventilation recesses of a housing arrangement, wherein the housing arrangement comprises at least one frame element which comprises a wall and an inner space configured by the wall for the acceptance of at least one battery cell of a battery system, wherein the ventilation recesses are provided at the wall, wherein the ventilation recesses comprise an alternating orientation such that the entry of the fluid through the ventilation recesses can occur alternatingly.

21. The ventilation system according to claim 20, wherein
at least the ventilation recesses or at least one air outlet opening are configured such that with an active blower an average static pressure occurs which corresponds to at least a 2-fold or 2.5-fold or 5-fold of a maximum or average dynamic pressure.

22. The ventilation system according to claim 20, wherein
the blower is connected with a heat exchanger in order to at least cool or heat the fluid.

23. The ventilation system according to claim 20, wherein
a back flow channel is provided, and for the acceptance of a fluid the back flow channel is connected with the wall in the area of at least one air outlet opening of the housing arrangement.

24. The ventilation system according to claim 23, wherein
at least the channel or the back flow channel comprises a diameter which corresponds to at least a 2-fold or 4-fold or 6-fold of a maximum diameter of the ventilation recesses.

25. A method for at least cooling or heating at least a battery system or at least a battery cell, wherein at least one housing arrangement is provided and the housing arrangement comprises at least one frame element which comprises a wall and an inner space configured by the wall for the acceptance of the battery system or battery cell, wherein at the wall multiple ventilation recesses are provided, wherein the ventilation recesses comprise an alternating orientation such that the entry of a fluid through the ventilation recesses occurs alternatingly.

* * * * *